(12) United States Patent
Aubele

(10) Patent No.: US 6,289,589 B1
(45) Date of Patent: Sep. 18, 2001

(54) METHOD AND DEVICE FOR PRODUCED FLANGED BEARINGS

(75) Inventor: Edwin Aubele, Taunusstein (DE)

(73) Assignee: Federal-Mogul Wiesbaden GmbH & Co. KG (DE)

(*) Notice: Subject to any disclaimer, the term of this patent is extended or adjusted under 35 U.S.C. 154(b) by 0 days.

(21) Appl. No.: 09/322,586

(22) Filed: May 28, 1999

(30) Foreign Application Priority Data

Jun. 3, 1998 (DE) .............................................. 198 24 741

(51) Int. Cl.[7] .................................................... B21D 53/10

(52) U.S. Cl. ................................. 29/898.047; 29/898.12; 29/898.056; 29/557

(58) Field of Search ........................ 29/898.047, 898.12, 29/898.13, 898.056, 898.045, 898.057, 557, 558, 465, 418

(56) References Cited

U.S. PATENT DOCUMENTS 2,119,900    6/1938  Bate .

FOREIGN PATENT DOCUMENTS 2123 804    11/1972  (DE) .

*Primary Examiner*—S. Thomas Hughes
*Assistant Examiner*—Marc W Butler
(74) *Attorney, Agent, or Firm*—Reising, Ethington, Barnes, Kisselle, Learman & McCulloch, P.C.

(57) ABSTRACT

A method for producing flanged bearings is described in which the blank (10) is punched out, forming at least two extension and holding portions (9, 9'), by means of which the blank (10) remains connected with the strip or the neighbouring blank during shaping. The flanged bearing is separated from the extension and holding portions (9, 9') once shaping is complete. A device for shaping blanks is also described, which comprises a die and a die barrel, as well as on each side a slide displaceable for the purpose of forming the flange.

11 Claims, 5 Drawing Sheets

Figure 3:
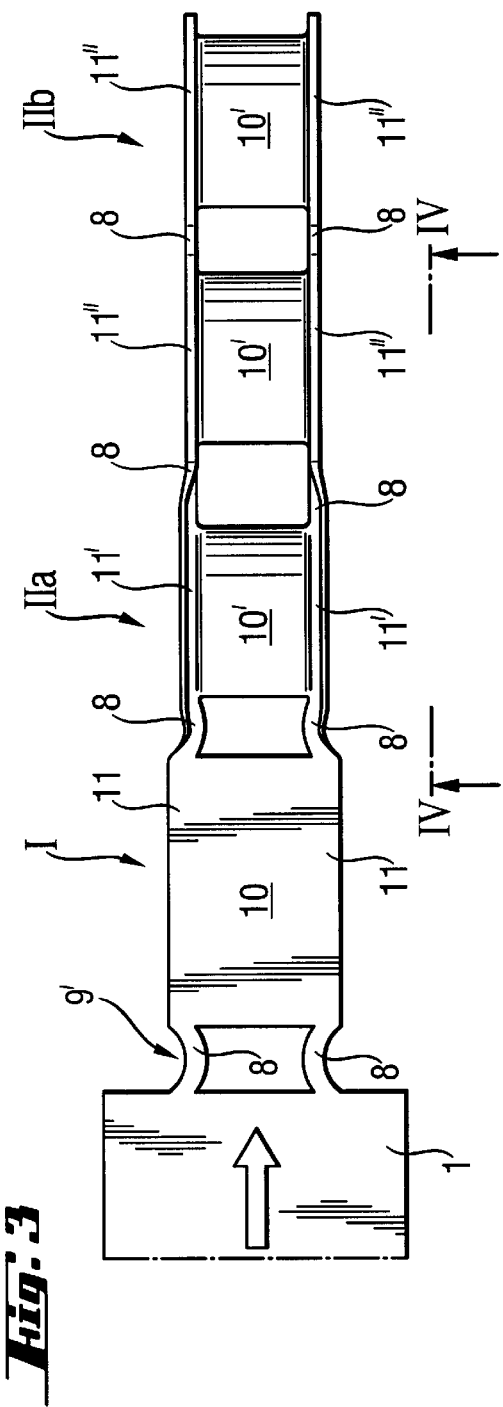

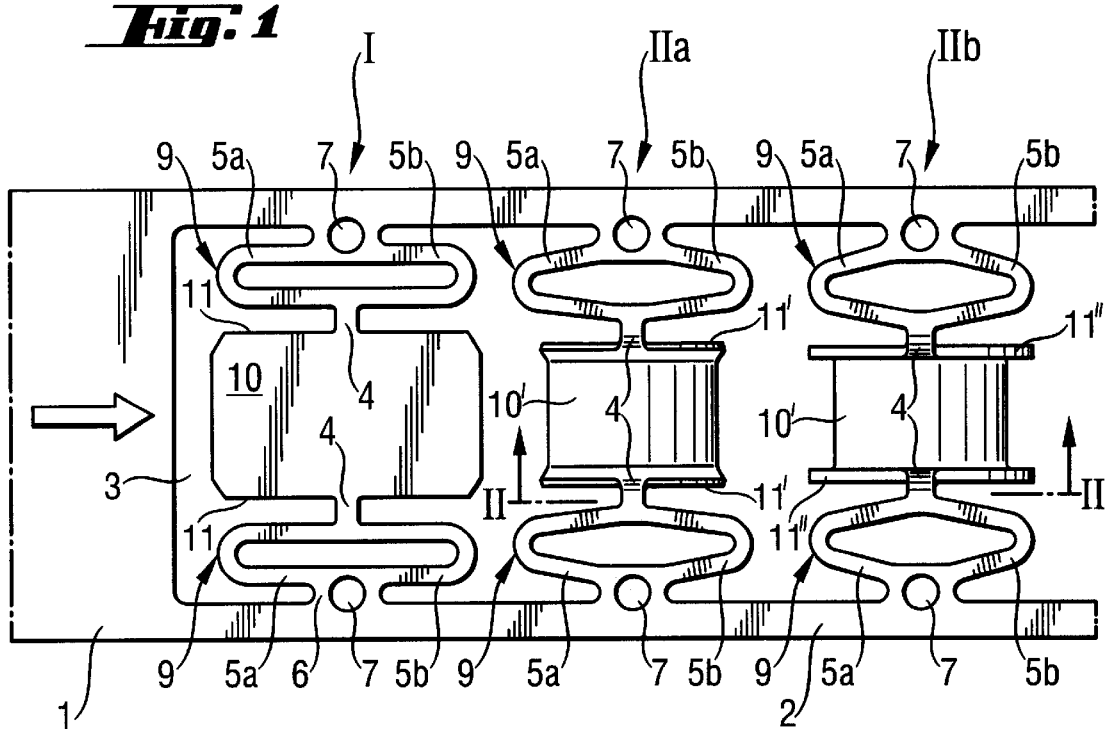
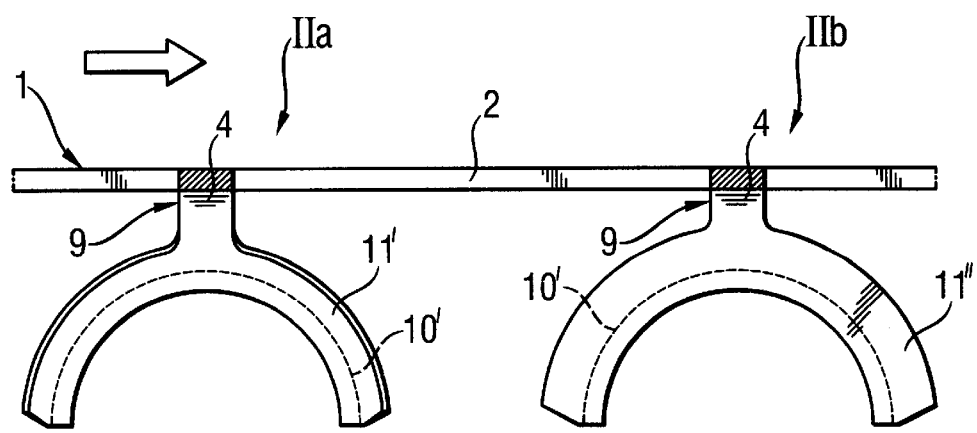

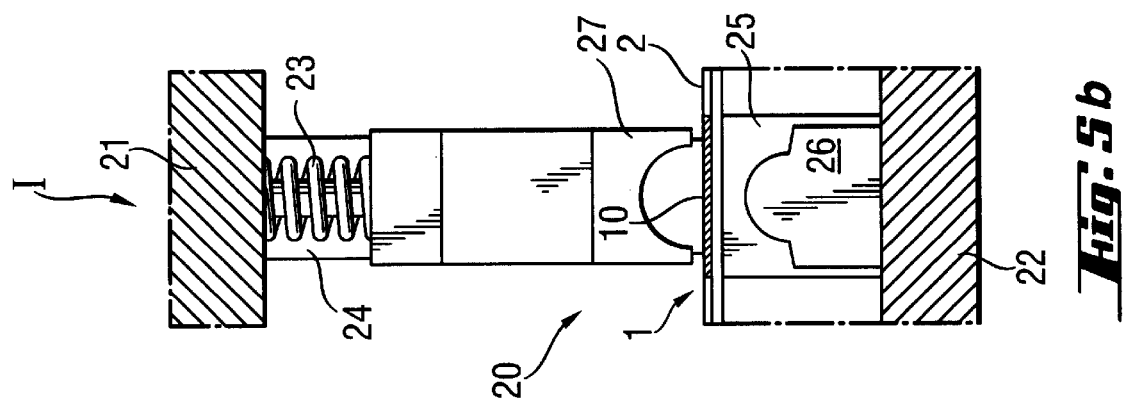
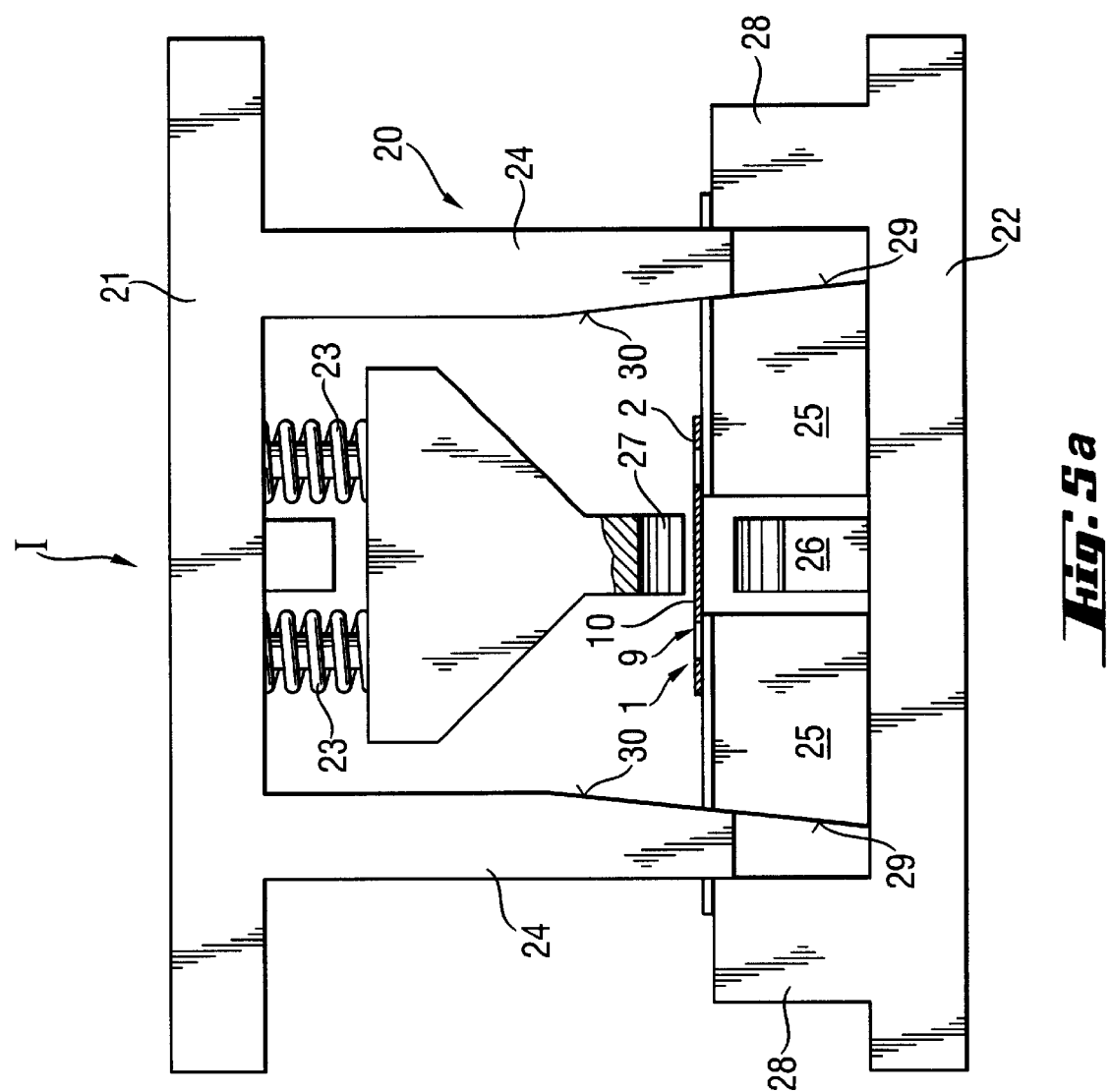

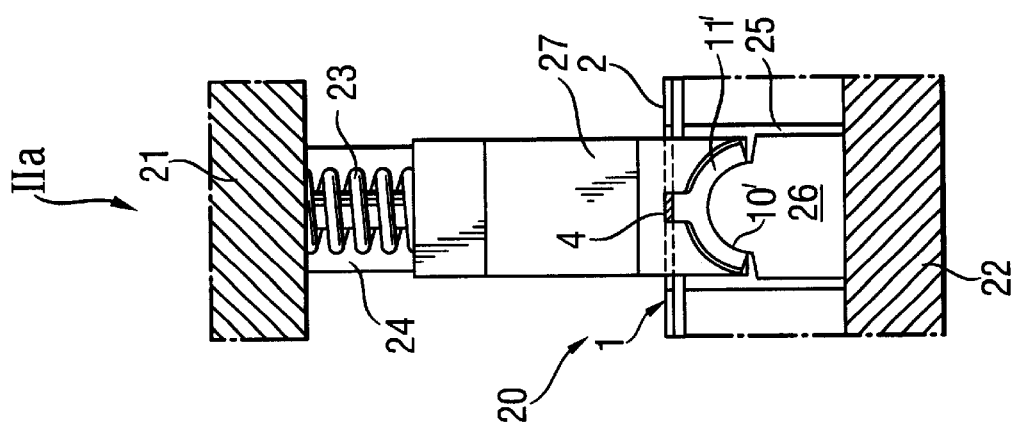
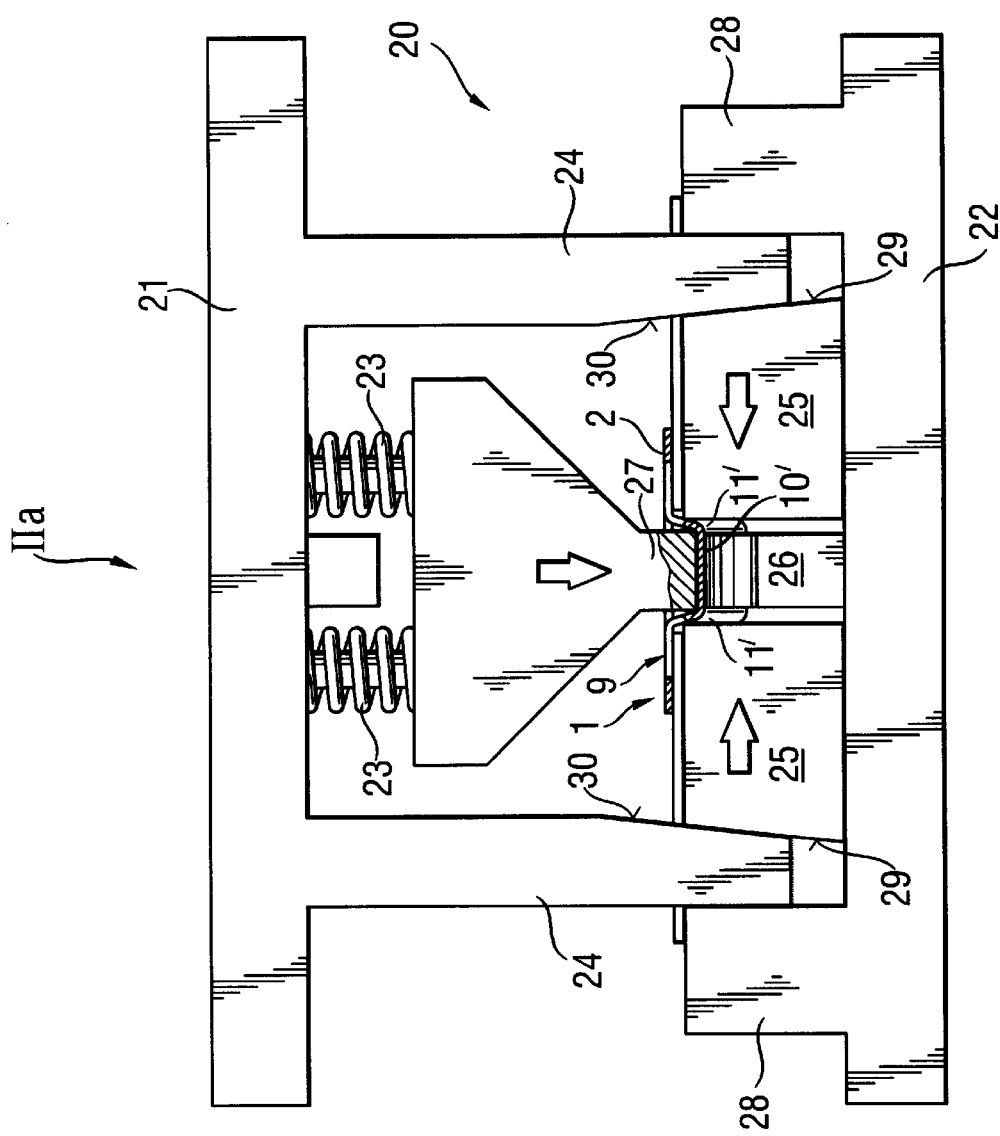

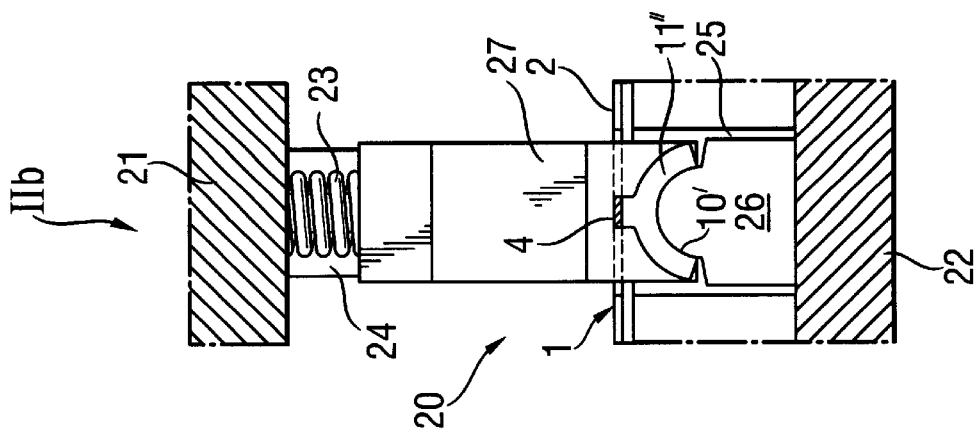
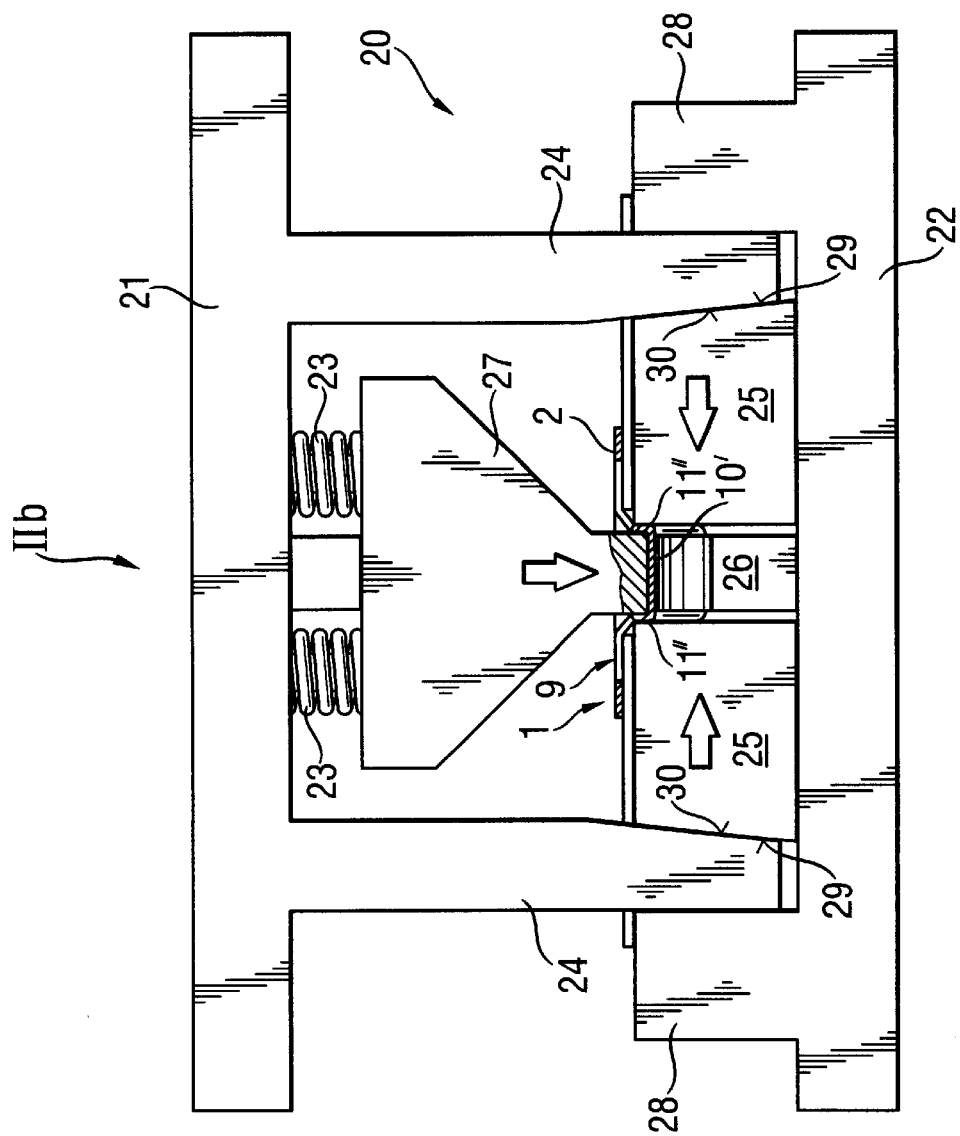

METHOD AND DEVICE FOR PRODUCED FLANGED BEARINGS

BACKGROUND OF THE INVENTION

1. Technical Field

The invention relates to a method for producing flanged bearings, in which a strip-form backing material is coated with overlay material, blanks are punched out of the coated strip and the blanks are formed into flanged bearings and finished. The invention also relates to a device for producing flanged bearings.

2. Related Prior Art

The production of flanged bearings entails a plurality of machining steps. Once the strip-form backing material has been coated with overlay material, the first step is to punch blanks out of the strips, whereafter grooves are formed in the area where the flange is to be produced. This means that the coating has to be removed in the area of the grooves. In the next manufacturing step, the flange is produced, after which the bearing shell is bent round, this being effected in a wrapping machine. The blank provided with the flange is clamped on a cylinder in the wrapping machine and a counter-cylinder effects the desired shaping.

This method exhibits a number of disadvantages. The punched-out blanks have to be gripped, held and transported by means of appropriate devices. This means that appropriate holding and receiving means have to be provided in the various machining stations, said means being more complicated, the smaller the flanged bearings. Moreover, handling of the blanks or partially formed bearings requires a lot of time, such that all in all it is possible to achieve only poor cycle times.

Another disadvantage is that only flanged bearings with maximum diameters of up to 30 mm may be produced. Wrapping machines are limited in particular by their drive mechanisms, which cannot be reduced in size at will owing to the considerable force required for wrapping flanged bearings. In the case of the production of flanged bearings with diameters<30 mm, there is a risk that the cylinder provided for shaping might possibly break.

SUMMARY OF THE INVENTION

The object of the invention is to provide a method which is distinguished by simplicity of blank handling and relatively high cycle times. The invention also relates to a device with which flanged bushes of any desired diameter may be produced.

This object is achieved using a method which is characterised in that, when the blank is punched out, at least two extension and holding portions are formed, by means of which the blank remains connected with the strip or the neighbouring blank during shaping and in that the flanged bearing is separated from the extension and holding portions once shaping is complete.

The advantage of this method is that, since the blank is not punched completely out of the strip, but rather remains connected to the strip or the neighbouring blank, the strip or this link may be used as a transporting aid for the blanks. The strip or linked series of several interconnected blanks arranged one after the other may be positioned far more precisely and with markedly less effort in the individual machining stations than is the case with individual blanks. The particular advantage of leaving the blanks connected to the edge of the strip during shaping is that a flat object has to be fixed in the machining stations, which is far simpler to achieve than fixing of a semi-finished product which is already partially shaped.

These measures contribute to the achievement of substantially shorter cycle times.

In order not to impair shaping of the blank into a flanged bearing despite the connection thereof with neighbouring blanks or with the strip, the extension portions are appropriately of flexible construction.

In this connection, a distinction should be made between two embodiments. According to a first embodiment, two extension and holding portions are each punched out laterally in the area of the flanged bearing which is subsequently to become the apex thereof. The extension and holding portions thus extend in the transverse direction, i.e. perpendicularly to the direction of feed of the strip. For the shaping process to be possible, these extension and holding portions are extensible in the transverse direction. On the other hand, high positioning accuracy has to be ensured, to which end the extension and holding portions are unyielding in the longitudinal direction of the strip, such that no relative disolacement of the blanks or the partially or wholly formed blanks in the longitudinal direction may occur during the shaping process.

The extension and holding portions preferably each comprise a web extending in the transverse direction and two loops extensible in the transverse direction. The loops are advantageously arranged symmetrically, such that only extension in the transverse direction may occur, and no displacement in the longitudinal direction of the strip. Extensibility is achieved in that the curvature of the loops may be varied.

To simplify positioning of the strip, locating holes are punched out in the edge area of the strip. Two holes are preferably provided per blank and are formed in the area of the edge in the vicinity of the holding and extension portions.

According to another embodiment, at least one arcuate web is punched out between each of the blanks. These arcuate webs are extensible only in the longitudinal direction of the blanks. The webs are connected with the blanks at the points at which the partial surfaces are located in a finished flanged bush. The webs are preferably located in the area where the flange will later be provided.

Shaping of the blank is preferably carried out in a die, such that the diameter of the flanged bearing is not restricted. The bearing shell is advantageously formed first, the edge of the bearing shell then being bent over to form the flange.

The device for forming blanks into flanged bearings comprises a die and a die barrel, on each side of which there is provided a slide displaceable for the purpose of forming the flange.

The blank is introduced into this device and formed into a bearing shell by closure of the die and die barrel, the blank being held by means of the holding and extension portions. After this forming process, the lateral slides are displaced towards the blank held by die and die barrel, such that the entire edge of the blank projecting with respect to the die and die barrel is bent.

On its side remote from the die and die barrel, the slide preferably comprises an inclined portion, which is engaged by the inclined portion of a tapered driving key moving in the vertical direction.

The die is attached by means of at least one spring to a top plate, on which the tapered driving wedges are advantageously also arranged. Lowering of the top plate and closure of the die also causes actuation of the tapered driving wedges, which are moved in the direction of the die and die barrel.

THE DRAWINGS

Figure 4:
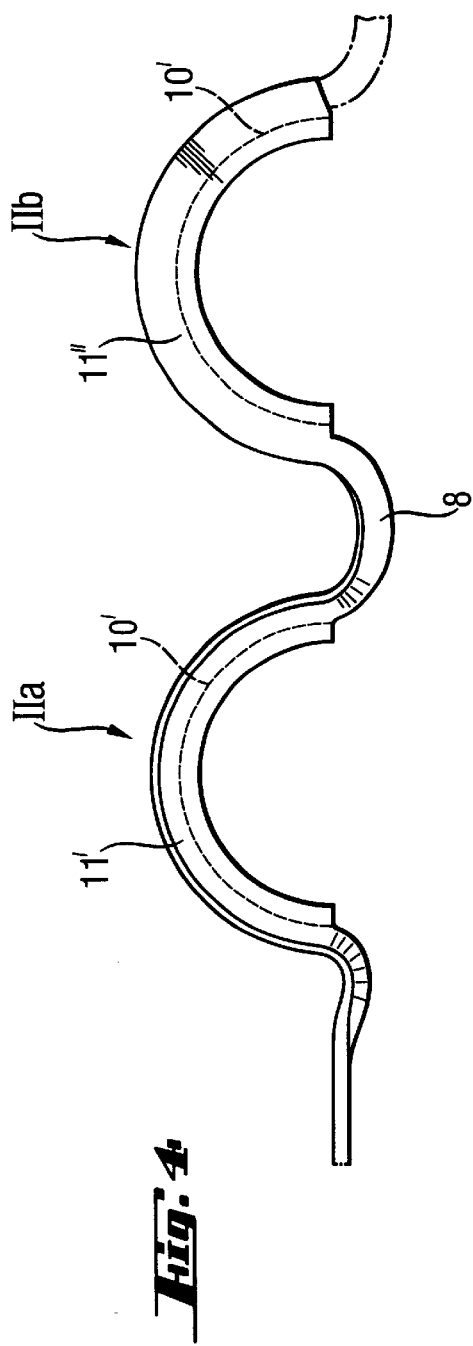

Exemplary embodiments of the invention are described in more detail below with the aid of the drawings, in which:

FIG. 1 is a plan view of a strip with punched-out and shaped blanks in various stages of machining, FIG. 2 is a side view of the partially and fully shaped blanks, FIG. 3 is a plan view of a strip with punched-out blanks in various stages of machining according to another embodiment, FIG. 4 is a side view of partially and fully shaped blanks according to the embodiment shown in FIG. 3, FIGS. 5a, 5b 6a, 6b, 7a, 7b are in each case two side views of a device for forming flanged bearings at three different machining stages.

DETAILED DESCRIPTION

FIG. 1 is a plan view of a coated strip 1, the longitudinal direction of feed of which is indicated by an arrow. In the machining station I, the blank or bearing blank portion 10 is punched out, remaining connected to an adjacent carrier portion such as the edge of the strip 1 by means of extension and holding portions 9 where the body of the strip serves as the carrier portion for the bearing blank portions 10.

In the embodiment shown here, two webs 4 are provided centrally on the two mutually opposing sides of the blank 10 as components of the extension and holding portions 9, which webs 4 develop into two loops 5a and 5b. The loops come together in a transition portion 6, which is connected with the edge 2 of the strip 1. The loops 5a and 5b form a symmetrical arrangement and may be extended in the transverse direction, while being unyielding in the longitudinal direction of the strip 1. In this way, it is ensured that there is adequate allowance for movement during shaping of the blank 10, as illustrated in the further machining steps IIa and IIb.

The curvature of the loops 5a and 5b is increased during machining steps IIa and IIb, because the transverse dimension of the blank 10 is diminished continuously by the shaping process. The bearing shell 10' is formed as early as machining step IIa, but the blank edge 11 is only partially bent over to form the flange 11' at that point. In machining step IIb, the partially bent flange 11' is bent over completely and designated 11". In this machining step the loops 5a and 5b are fully bent open.

In the area of the transition portions 6, locating holes 7 are punched out in which there engage corresponding locating pins in the shaping device, thereby ensuring eat positioning of the blank to be machined.

FIG. 2 is a side view of the blanks after machining steps IIa and IIb. It clearly reveals that the bearing shells 10' are held in the apex area by means of the webs 4.

FIG. 3 shows a further embodiment, in which the individual blanks or bearing blank portions 10 are connected together by means or curved webs 8, which form the extension and holding portions 9' in such manner that the blank portions 10 serve as adjacent carrier portions for one another. The strip 1 is punched in the machining step I in such a way that the blank 10 exhibits its final width, wherein no edge of the strip 1 is left. Connection with the strip 1 or with the neighbouring blank is effected by means of the inwardly curved webs 8, which are extensible in the longitudinal direction. The webs 8 are arranged on the narrow side of the blanks 10, on which the partial surfaces of the flanged bearing are formed after the shaping process. The blank is formed into a bearing shell 10' as early as machining step IIa, but the blank edge 11 is only partially bent over at that point (partially formed flange 11'). The webs 8 have already been partially stretched. When the flange 11" is completely bent over, the webs 8 are fully stretched. The flanged bearings shown in the right-hand part of FIG. 3 are still connected together by the two webs 8. After production of the flanged bearings, they are separated from the webs 8. This step may optionally also be followed by finishing, such as broaching or drilling for example.

FIG. 4 is a side view of the blanks after machining steps IIa and IIb. It clearly reveals that the bearing shells 10' are held at the partial surfaces by means of the webs 4.

FIGS. 5 to 7 show a device 20 for forming flanged bearings. The main component is a die 27 with a die barrel 26, these exhibiting the shape of the flanged bearing to be produced. The die barrel 26 is attached in stationary manner, while the die 27 is arranged so as to be movable in the vertical direction. To this end, a top plate 21 is provided which comprises two springs 23 on its underside, which springs 23 are attached to the die 27.

In addition, two tapered driving keys 24 are attached to the top plate 21, which keys 24 each comprise an inclined portion 30 in their lower end portion. These inclined portions 30 engage with corresponding inclined portions 29 of slides 25, which are arranged on the base plate 22 to the sides of the die 27 or the die barrel 26. If the top plate 21 is lowered, both the die 27 and the tapered driving keys 24 move perpendicularly downwards. The spring force of the springs 23 is such that the die is firstly lowered into its lower position for shaping of the blank 10. As shown in FIG. 6a, when the top plate 21 is lowered further the springs 23 are compressed and the tapered driving key 24 is lowered completely, whereby the slides 25 are pushed together (see FIGS. 7a, b). During this process the tapered driving keys 24 rest on the back supports 28, which are arranged in stationary manner on the base plate 22. As illustrated in FIGS. 7a and 7b, the slides 25 are displaced until the flange 11" is fully bent.

FIGS. 5b, 6b and 7b show clearly that the bearing shell 10' remains connected to the edge 2 of the strip 1 during this forming process by means of the webs 4 and the loops not shown in this drawing.

LIST OF REFERENCE NUMERALS

1 Strip
2 Edge
3 Punched out portion
4 Web
5a, b Loops
6 Transition portion
7 Locating hole
8 Web
9, 9' Extension and holding portion
10 Blank
10' Bearing shell
11 Blank edge
11' Partially formed flange
11" Flange
20 Forming device
21 Top plate 22 Base plate
23 Spring
24 Tapered driving key
25 Slide
26 Die barrel
27 Die
28 Back support
29 Inclined portion
30 Inclined portion

What is claimed is:

1. A method of producing flanged bearings comprising:

coating a strip-form backing material with an overlay material to form a coated strip;

punching at least one bearing blank portion from the coated strip and at least two associated holding portions formed unitarily with and extending between the bearing blank portion and adjacent carrier portions of the coated strip, such that the bearing blank portion is functionally disconnected from the coated strip in such manner as to enable the bearing blank portion to be subsequently formed into a flanged bearing while remaining attached by the holding portions to the adjacent carrier portions of the coated strip;

while the bearing blank portion is connected by the holding portions to the adjacent carrier portions of the coated strip, forming the bearing blank portion into the shape of a flanged bearing; and after the flanged bearing has been formed from the bearing blank portion, disconnecting the flanged bearing from the associated holding portions.

2. The method of claim 1 including forming the adjacent carrier portions as a body of the coated strip material.

3. The method of claim 1 including forming the adjacent carrier portions from additional bearing blank portions adjacent said at least one bearing blank portion.

4. The method of claim 1 including forming the flanged bearing to include an apex between opposite ends thereof, and locating the holding portions on the bearing blank portions such that the holding portions extend laterally from the apex when the flanged bearing is formed.

5. The method of claim 1 wherein the bearing blank portion has a longitudinal direction, and forming the holding portions such that the holding portions yield during the formation of the flanged bearing from the bearing blank portion in a transverse direction relative to the longitudinal direction of the bearing blank portion and are unyielding in the longitudinal direction of the bearing blank portion.

6. The method of claim 5 including forming each holding portion to include a web extending transversely from the bearing blank portion and a pair of loop portions which extend in the transverse direction during the forming of the flanged bearing from the bearing blank portion.

7. The method of claim 6 including punching a hole in the holding portions.

8. The method of claim 1 including punching at least a pair of the bearing blank portions from the coated strip arranged adjacent to one another in a longitudinal direction of the coated strip and forming at least one of the holding portions as a unitary arcuate web of the coated strip material extending longitudinally between and interconnecting the adjacent bearing blank portions.

9. The method of claim 8 wherein during the forming of the flanged bearings from the bearing blank portions, extending the arcuate web in the longitudinal direction of the coated strip.

10. The method of claim 1 including forming the flanged bearing in a die.

11. The method of claim 10 wherein during the forming of the flanged bearing, first the blank portion in the die in an arcuate shape to prepare an arcuate bearing shell portion of the flanged bearing and thereafter bending lateral side regions of the bearing blank portion to prepare side flanges of the flanged bearing.

* * * * *

UNITED STATES PATENT AND TRADEMARK OFFICE
CERTIFICATE OF CORRECTION

PATENT NO.   : 6,289,589 B1
DATED        : September 18, 2001
INVENTOR(S)  : Edwin Aubele It is certified that error appears in the above-identified patent and that said Letters Patent is hereby corrected as shown below:

<u>Title page, Item [54], Column 1, line 1,</u>
Change title from "METHOD AND DEVICE FOR PRODUCED FLANGED BEARINGS" to -- METHOD AND DEVICE FOR PRODUCING FLANGED BEARINGS --.

<u>Column 2,</u>
Line 21, change "disolacement" to -- displacement --.

<u>Column 3,</u>
Line 28, after "edge" insert -- 2 --;
Line 54, change "eat" to -- exact --;
Line 61, change "or" to -- of --;

<u>Column 4,</u>
Cancel lines 50-67.

<u>Column 5,</u>
Cancel lines 1-9.

<u>Column 6,</u>
Line 32, after "first" insert -- forming --.

Signed and Sealed this

Tenth Day of September, 2002

Attest:

Attesting Officer

JAMES E. ROGAN
*Director of the United States Patent and Trademark Office*